(12) United States Patent
Chang et al.

(10) Patent No.: US 11,587,325 B2
(45) Date of Patent: Feb. 21, 2023

(54) SYSTEM, METHOD AND STORAGE MEDIUM FOR DETECTING PEOPLE ENTERING AND LEAVING A FIELD

(71) Applicant: Industrial Technology Research Institute, Hsinchu (TW)

(72) Inventors: Shu-Hsin Chang, Tainan (TW); Yao-Chin Yang, Hsinchu (TW); Yi-Yu Su, Hsinchu (TW); Kun-Hsien Lu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 162 days.

(21) Appl. No.: 17/136,040

(22) Filed: Dec. 29, 2020

(65) Prior Publication Data

US 2022/0067391 A1 Mar. 3, 2022

Related U.S. Application Data

(60) Provisional application No. 63/074,459, filed on Sep. 3, 2020.

(51) Int. Cl.
*G06V 20/52* (2022.01)
*H04N 5/232* (2006.01)
(Continued)

(52) U.S. Cl.
CPC ............. *G06V 20/53* (2022.01); *G06V 10/22* (2022.01); *G06V 20/40* (2022.01); *G06V 40/103* (2022.01); *H04N 5/23229* (2013.01); *G06V 20/44* (2022.01)

(58) Field of Classification Search
CPC ........ G06V 10/22; G06V 20/40; G06V 20/44; G06V 20/52; G06V 20/53; G06V 40/10;
(Continued)

(56) References Cited

U.S. PATENT DOCUMENTS 8,295,545 B2 10/2012 Hampapur et al.
9,638,800 B1 * 5/2017 Skowronek ............. G01S 17/42
(Continued)

FOREIGN PATENT DOCUMENTS

CN 104137155 11/2016
CN 107437281 12/2017
(Continued)

OTHER PUBLICATIONS

CN 110135382 A Machine Translation (Year: 2019).*
(Continued)

*Primary Examiner* — Michelle M Entezari
(74) *Attorney, Agent, or Firm* — JCIPRNET

(57) ABSTRACT

A method for detecting people entering and leaving a field is provided in an embodiment of the disclosure. The method includes the following. An event detection area corresponding to an entrance is set, and the event detection area includes an upper boundary, a lower boundary, and an internal area, and the lower boundary includes a left boundary, a right boundary, and a bottom boundary; a person image corresponding to a person in an image stream is detected and tracked; and whether the person passes through or does not pass through the entrance is determined according to a first detection result and a second detection result.

19 Claims, 9 Drawing Sheets

(51) Int. Cl.
*G06V 10/22* (2022.01)
*G06V 20/40* (2022.01)
*G06V 40/10* (2022.01)

(58) Field of Classification Search
CPC .. G06V 40/103; G06V 40/50; H04N 5/23229; H04N 7/183
See application file for complete search history.

(56) References Cited

U.S. PATENT DOCUMENTS

| | | | |
|---|---|---|---|
| 9,971,941 | B2 | 5/2018 | Yang |
| 10,235,854 | B2 | 3/2019 | Trani |
| 10,574,899 | B2 | 2/2020 | Wang et al. |
| 2007/0003141 | A1 | 1/2007 | Rittscher et al. |
| 2008/0284593 | A1* | 11/2008 | Soto ............... G08B 13/248 340/541 |
| 2010/0322516 | A1 | 12/2010 | Xu et al. |
| 2012/0170902 | A1* | 7/2012 | Zhu .................. G06F 16/78 707/769 |
| 2013/0148848 | A1* | 6/2013 | Lee ................. G06V 20/52 382/103 |
| 2015/0009332 | A1* | 1/2015 | Fuhrmann ............ G07C 9/00 348/155 |
| 2018/0278801 | A1* | 9/2018 | Ohno ............... G06V 20/52 |
| 2019/0130677 | A1* | 5/2019 | Kitagawa ........... G06V 20/52 |
| 2019/0206085 | A1* | 7/2019 | Jiang .................. G06T 7/246 |
| 2020/0064784 | A1* | 2/2020 | Steiner .............. G01S 13/50 |
| 2020/0202544 | A1* | 6/2020 | Barish ................ G06T 7/55 |

FOREIGN PATENT DOCUMENTS

| | | | |
|---|---|---|---|
| CN | 104899574 | 8/2018 | |
| CN | 110135382 A | * 8/2019 | ......... G06K 9/00362 |

OTHER PUBLICATIONS

Ciccimaro DA, Everett HR, Bruch MH, Phillips CB. A supervised autonomous security response robot. Space and Naval Warfare Systems Center San Diego CA; Apr. 1, 1999. (Year: 1999).*

Lo, Chi-Wen, Kun-Lin Wu, and Jing-Sin Liu. "Wall following and human detection for mobile robot surveillance in indoor environment." 2014 IEEE International Conference on Mechatronics and Automation. IEEE, 2014. (Year: 2014).*

Dai D, Jiang G, Xin J, Gao X, Cui L, Ou Y, Fu G. Detecting, locating and crossing a door for a wide indoor surveillance robot. In2013 IEEE international conference on robotics and biomimetics (ROBIO) Dec. 12, 2013 (pp. 1740-1746). IEEE. (Year: 2013).*

Lo CW, Wu KL, Lin CW, Liu JS. Reactive human-aware wall following for indoor mobile robot. 2017. (Year: 2017).*

Maja J. Integration of representation into goal-driven behavior-based robots. IEEE transactions on robotics and automation. Jun. 1992;8(3):304-12. (Year: 1992).*

Katayama AS. Streak visualization: a new analysis tool for the evaluation of video sequences. InHigh-Speed Imaging and Sequence Analysis May 17, 1999 (vol. 3642, pp. 80-91). SPIE. (Year: 1999).*

X. Liu, et al., "Detecting and Counting People in Surveillance Applications", IEEE Conference on Advanced Video and Signal Based Surveillance, 2005., Sep. 15-16, 2005, pp. 306-311.

Javier Barandiaran, et al., "Real-Time People Counting Using Multiple Lines", 2008 Ninth International Workshop on Image Analysis for Multimedia Interactive Services, May 7-9, 2008, pp. 159-162.

Jorge García, et al., "Directional People Counter Based on Head Tracking", IEEE Transactions on Industrial Electronics, vol. 60, No. 9, Jul. 6, 2012, pp. 3991-4000.

Bin Li, et al., "A people counting method based on head detection and tracking", 2014 International Conference on Smart Computing, Nov. 3-5, 2014, pp. 137-141.

Zebin Cai, et al., "Counting People in Crowded Scenes by Video Analyzing", 2014 9th IEEE Conference on Industrial Electronics and Applications, Jun. 9-11, 2014, pp. 1841-1845.

Jau-Woei Perng, et al., "The Design and Implementation of a Vision-based People Counting System in Buses", 2016 International Conference on System Science and Engineering (ICSSE), Jul. 7-9, 2016, pp. 1-3.

"Office Action of Taiwan Counterpart Application", dated Oct. 4, 2021, p. 1-p. 6.

* cited by examiner

SYSTEM, METHOD AND STORAGE MEDIUM FOR DETECTING PEOPLE ENTERING AND LEAVING A FIELD

CROSS-REFERENCE TO RELATED APPLICATION

This application claims the priority benefit of U.S. Provisional Application No. 63/074,459, filed on Sep. 3, 2020. The entirety of the above-mentioned patent application is hereby incorporated by reference herein and made a part of this specification.

BACKGROUND

Technical Field

The disclosure relates to an image analysis technology, and in particular to a system, method, and storage medium for detecting people entering and leaving a field.

Description of Related Art

A people counting technology has been widely applied in many scenarios, such as counting the number of people passing an entrance in a public place, and managing people entering and leaving a restricted area. Data of people flow obtained in these application scenarios may serve as information that may facilitate security, marketing operations, service quality, and resource allocation. Conventionally, the number of people entering and leaving an entrance is commonly counted by, for example, manual labor, or using sensors such as an infrared sensor and a radio frequency identification (RFID) sensor disposed at the entrance. In counting the number of people entering and leaving a field, it requires labor to manually count the number, and the infrared sensor cannot distinguish between one person and multiple people moving in parallel or between a person and a non-human object, and the RFID sensor requires a person to carry an RFID tag. When the number of people entering and leaving a field is manually counted, the number may be miscounted due to human fatigue. When the number of people entering and leaving a field is counted by the infrared or RFID sensor, the number may also be miscounted when a large number of people enter and leave or when some people do not carry the RFID tag. Therefore, people counting based on the methods described above may be inaccurate.

With the advancement of science and technology, functions of a camera are no longer limited to obtaining and storing images. Today, the functions further include analyzing the content of an image, and detecting, tracking, and locating objects in the image. Therefore, camera image analysis has been adopted in the existing people counting technology to achieve automatic detection. Generally, before the camera image is used to detect people entering and leaving a field, a boundary line needs to be set at a position on the camera screen corresponding to a field entrance, and the number of people counted is the number of people whose feet or head crosses the boundary line. However, when the entrance is crowded, detecting people entering and leaving a field by feet detection may fail because the lower body of a person is often blocked so a feet image does not appear on the screen. In addition, detecting people entering and leaving a field by head detection is less tolerant of people's height differences. Based on the above, a technology that counts the number of people entering and leaving a field more accurately is an important issue in the field.

SUMMARY

A system, method, and storage medium for detecting people entering and leaving a field which reduce the misdetection rate and increase the accuracy of detecting people entering and leaving a field are provided in the disclosure.

An embodiment of the disclosure provides a system for detecting people entering and leaving a field. The system includes a camera and a processor. The camera is disposed at a high place, captures an entrance from a depression angle and outputs an image stream at the same time. The processor is coupled to the camera. The processor is configured to receive the image stream and set an event detection area corresponding to the entrance. The event detection area includes an upper boundary, a lower boundary, and an internal area, and the lower boundary includes a left boundary, a right boundary, and a bottom boundary. The processor is configured to detect and track a person image corresponding to a person in the image stream. The person image is a whole-body image or a partial image. The processor is configured to determine whether the person passes through or does not pass through the entrance according to a first detection result and a second detection result. When the first detection result indicates that a coordinate position where a candidate area corresponding to the person image first appears is located in the internal area, and the second detection result indicates that the candidate area passes through the lower boundary and leaves the event detection area, the processor determines that the person passes through the entrance. When the first detection result indicates the candidate area moves from outside the event detection area, passes through the lower boundary, and enters the internal area, and the second detection result indicates that a coordinate position where the candidate area disappears is located in the internal area, the processor determines that the person passes through the entrance.

An embodiment of the disclosure provides a method for detecting people entering and leaving a field, which is adapted for a system that includes a camera and a processor. The camera is disposed at a high place, and captures an entrance from a depression angle and outputs an image stream at the same time. The processor receives the image stream. The method includes the following. An event detection area corresponding to the entrance is set, and the event detection area includes an upper boundary, a lower boundary, and an internal area, and the lower boundary includes a left boundary, a right boundary, and a bottom boundary; a person image corresponding to a person in the image stream is detected and tracked, and the person image is a whole-body image or a partial image; and whether the person passes through or does not pass through the entrance is determined according to a first detection result and a second detection result, and when the first detection result indicates that a coordinate position where a candidate area corresponding to the person image first appears is located in the internal area, and the second detection result indicates that the candidate area passes through the lower boundary and leaves the event detection area, the processor determines that the person passes through the entrance, and when the first detection result indicates that the candidate area moves from outside the event detection area, passes through the lower boundary, and enters the internal area, and the second detection result indicates that a coordinate position where the candidate area disappears is located in the internal area, the processor determines that the person passes through the entrance.

An embodiment of the disclosure provides a non-transitory computer readable storage medium. The non-transitory computer readable storage medium includes at least one program instruction. After an electronic apparatus loads and executes the at least one program instruction, the method for detecting people entering and leaving a field is completed.

Several exemplary embodiments accompanied with figures are described in detail below to further describe the disclosure in details.

DESCRIPTION OF THE EMBODIMENTS

The technical contents, features, and efficacies of the disclosure described above and hereinafter will be clearly presented in the following detailed description of an exemplary embodiment in connection with accompanying drawings. Directional terms in the following embodiments, such as up, down, left, right, front, or back, etc., are only directions demonstrated in the accompanying drawings. Therefore, the directional terms are used to illustrate but not to limit the disclosure.

Figure 1:
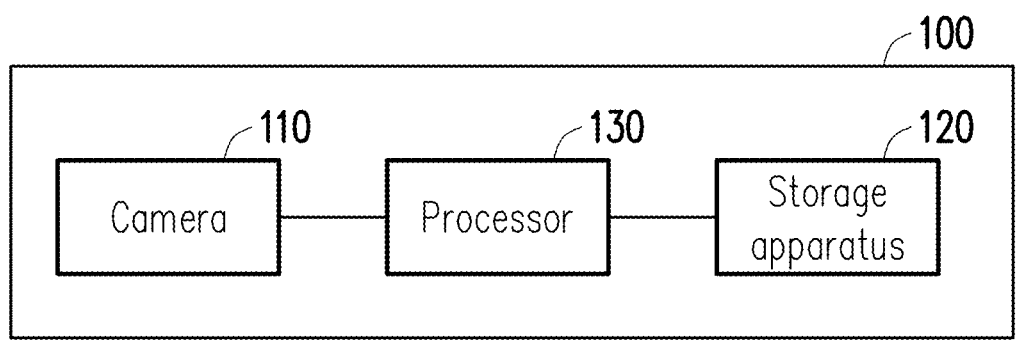
FIG. 1 is a block diagram illustrating a system for detecting people entering and leaving a field according to an embodiment of the disclosure.

FIG. 1 is a block diagram illustrating a system for detecting people entering and leaving a field according to an embodiment of the disclosure. Referring to FIG. 1, a system 100 for detecting people entering and leaving a field has a camera 110, a storage apparatus 120, and a processor 130.

The camera 110 is configured to capture an image. The camera 110 is, for example, a camera equipped with a charge coupled device (CCD), a complementary metal-oxide semiconductor (CMOS) device, or other kinds of photosensitive devices. Alternatively, the camera 110 may be an image capture device with a depth information function such as a depth camera or a stereoscopic camera. The camera 110 may be a camera of any model and issued by any brand, and the disclosure is not limited thereto.

The storage apparatus 120 is configured to store various types of codes and data required for the execution of the system 100. The storage apparatus 120 is, for example, but not limited to, any type of fixed or movable devices such as a random access memory (RAM), a read-only memory (ROM), a flash memory, a hard disk drive (HDD), a solid state drive (SSD), other similar devices, or a combination of the devices described above, and the disclosure is not limited thereto.

The processor 130 is, for example, a central processing unit (CPU), or other programmable general-purpose or special-purpose devices such as a microprocessor, a digital signal processor (DSP), a programmable controller, an application specific integrated circuits (ASIC), a programmable logic device (PLD), other similar devices, or a combination of the devices described above, and the disclosure is not limited thereto. The processor 130 is connected to the camera 110 and the storage apparatus 120, and is configured to receive the image from the camera 110, access the codes and data of the storage apparatus 120, operate and process the data, etc., so as to complete various operations that the system 100 requires. In addition, the processor 130 may drive a display or a network interface according to specific needs, and the image and results of data operation and processing may be displayed on the display or be transmitted to the network, and the disclosure is not limited thereto.

In an embodiment of the disclosure, the camera 110 of the system 100 is externally connected to the processor 130 in a wired or wireless manner. Alternatively, the storage apparatus 120 and the processor 130 are disposed in the camera 110 and connected to various electrical devices of the camera 110. The disclosure is not limited thereto.

Figure 2:
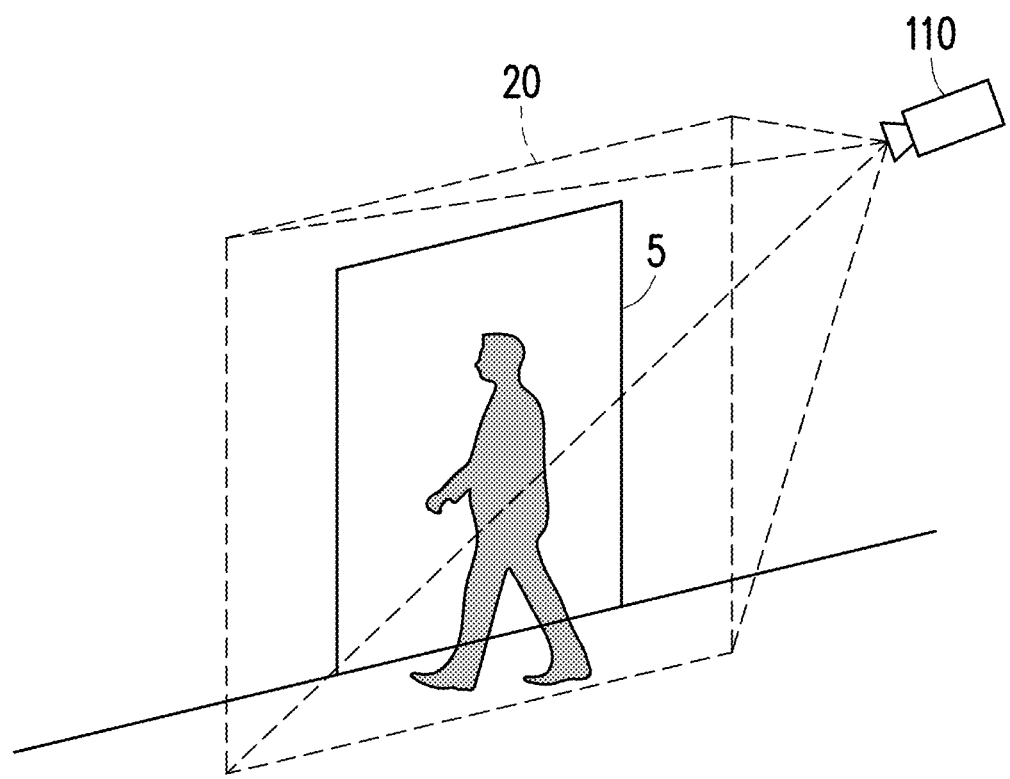
FIG. 2 is a schematic diagram illustrating a scenario according to an embodiment of the disclosure.

FIG. 2 is a schematic diagram illustrating a scenario according to an embodiment of the disclosure. Referring to FIG. 2. the camera 110 may be disposed at a high place to capture an entrance 5 from a depression angle, and output an image stream corresponding to a field of view (FOV) 20 of the camera 110 to the processor 130 at the same time. At this time, an optical axis of the camera 110 points towards below the horizontal line and forms an angle with the horizontal line to capture the entrance 5. The configuration described above is commonly applied to an entrance monitor in a general field. In this embodiment, opaque walls are disposed on the left and right sides of the entrance 5 to separate an area that is inside a field from an area that is outside the field, and the camera 110 may be disposed inside or outside the field. The opaque walls generally refer to opaque objects that block the line of sight beyond the left and right sides of the entrance 5. The opaque walls are not limited to upright walls in the disclosure.

Figure 3:
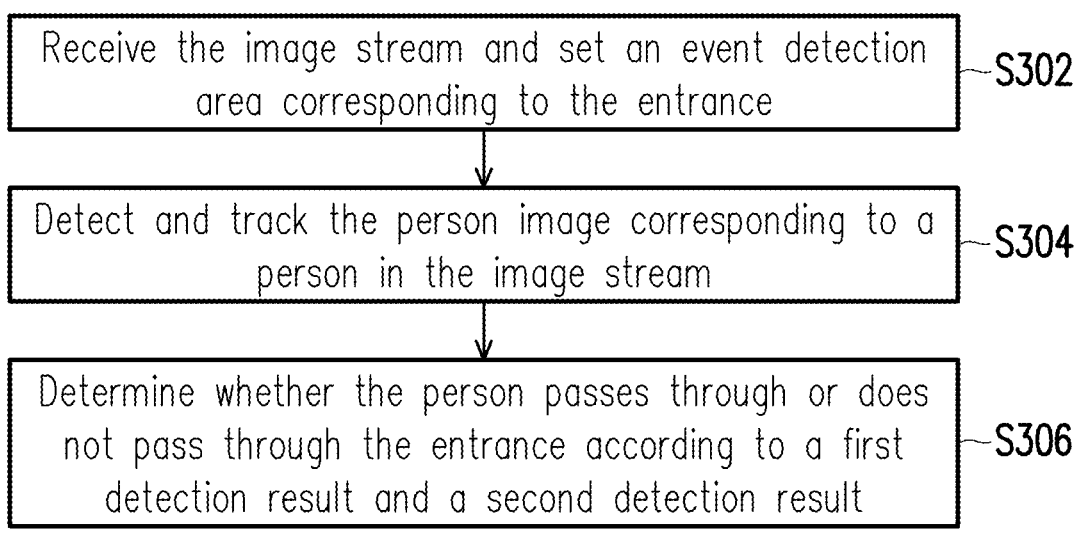
FIG. 3 is a flowchart illustrating a method for detecting people entering and leaving a field according to an embodiment of the disclosure.

FIG. 3 is a flowchart illustrating a method for detecting people entering and leaving a field according to an embodiment of the disclosure. The method of this embodiment is at least applicable to the system 100, but the disclosure is not limited thereto. Referring to FIGS. 1 to 3 together, the detailed steps of the method for detecting people entering and leaving a field in this embodiment are described below in connection with various apparatus and devices of the system 100.

In step S302, the processor 130 is configured to receive the image stream and set an event detection area corresponding to the entrance. Specifically, the processor 130 sets the event detection area corresponding to an image frame in advance. The event detection area includes a boundary and an internal area. The event detection area is, for example, a rectangle, a trapezoid, a polygon, an ellipse, or other geometric shapes, and the disclosure is not limited thereto. In addition, the processor 130 further sets the event detection area according to physical parameters of people in the real world and a boundary between the entrance and the walls. For example, the processor 130 may receive physical parameters of a person input by a user through an input apparatus (not shown), and automatically identify the entrance in the image frame to calculate the event detection area in the image frame. Alternatively, the processor 130 may read a coordinate profile of the event detection area from the storage apparatus 120, and the disclosure is not limited thereto.

Figure 4:
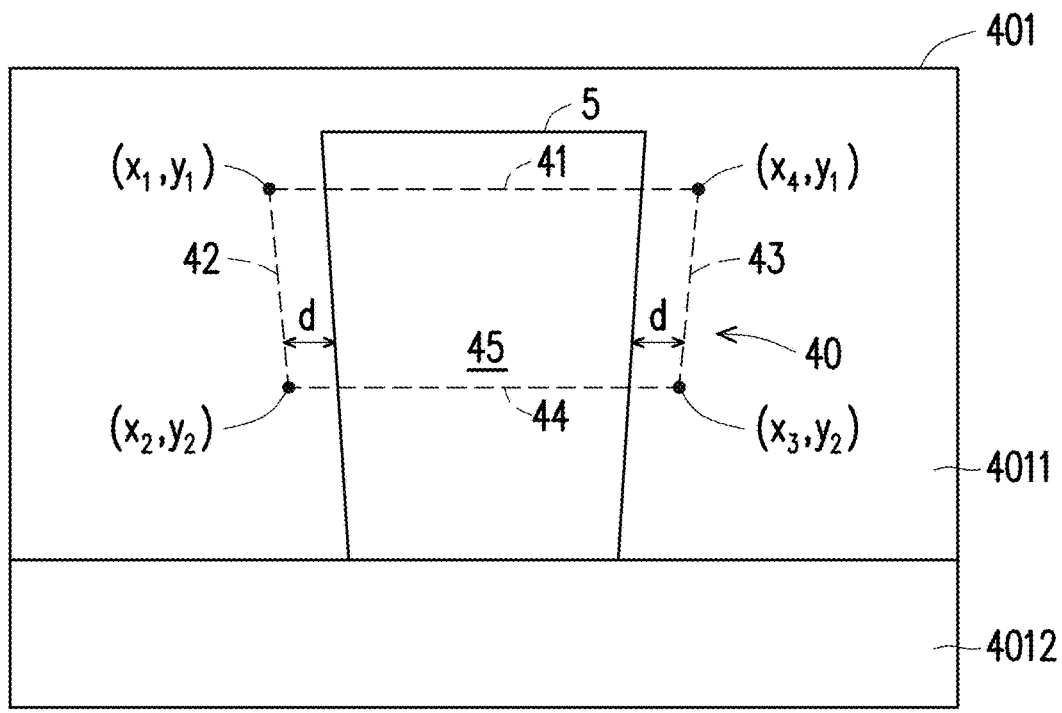
FIG. 4 is a schematic diagram illustrating an event detection area according to an embodiment of the disclosure.

FIG. 4 is a schematic diagram illustrating an event detection area according to an embodiment of the disclosure. Referring to FIG. 4, when the camera is disposed at a high place to capture an image of the entrance 5 from a depression angle, an image frame 401 included in the image stream may cover objects including the entrance 5, a wall 4011, a floor 4012, etc. The wall 4011 is an opaque wall that shields people outside the entrance 5. Since the camera captures an image from a depression angle, if the entrance 5 is a rectangle in the real world, the entrance 5 appears in the image frame 401 as a trapezoid with a wide top and a narrow bottom as shown in FIG. 4. In this embodiment, the processor 130 disposes an event detection area 40 corresponding to the entrance 5. For example, the event detection area 40 includes an upper boundary 41, a lower boundary, and an internal area 45. The internal area 45 is a closed area enclosed by the upper boundary 41 and the lower boundary, and the lower boundary includes a left boundary 42, a right boundary 43, and a bottom boundary 44. In this embodiment, the upper left corner coordinates of the event detection area 40 are $(x_1, y_1)$, the upper right corner coordinates are $(x_4, y_1)$, the lower left corner coordinates are $(x_2, y_2)$, and the lower right corner coordinates are $(x_3, y_2)$. It is to be noted that the lower boundary may also be set to be a semi-circular arc shape or any line according to the shape of the entrance, so that the lower boundary and the upper boundary enclose a closed area with an area, and the disclosure is not limited thereto.

In addition, the processor 130 sets the event detection area 40 according to the physical parameters of people in the real world and the boundary between the entrance 5 and the wall. Specifically, the processor 130 sets the height position of the upper boundary 41 in the image frame 401 according to a first preset height, and sets the height position of the bottom boundary 44 in the image frame 401 according to a second preset height. In this embodiment, the first preset height is the height of a person with the tallest height (for example, 200 cm) expected to be detected. The second preset height is the height of a person with the shortest height (for example, 100 cm) expected to be detected. The processor 130 sets the height position of the upper boundary 41 in the image frame 401 to be higher than the height corresponding to the first preset height in the image frame 401, so that when anyone (even the highest person) stands in front of the entrance or inside the walls (that is, on the side where the camera is located), a head reference point corresponding to the person is lower than the upper boundary 41. In addition, the processor 130 sets the height position of the bottom boundary 44 in the image frame 401 to be lower than the height corresponding to the second preset height in the image frame 401, so that when anyone (even the shortest person) stands behind the entrance or outside the walls (that is, on the opposite side where the camera is located), the head reference point corresponding to the person is higher than the bottom boundary 44. In other words, the processor 130 determines the first preset height and second preset height according to the height range of people in the real world.

In addition, referring to FIG. 4, the entrance 5 may include a left wall and a right wall. The left wall corresponds to a left edge line, and the right wall corresponds to a right edge line. The processor 130 may set the left boundary 42 and the right boundary 43 according to the left edge line and the right edge line. In this embodiment, the processor 130 sets the left boundary 42 to be to the left of the left edge line and sets the distance between the left boundary 42 and the left edge line to be a preset head width range d, and sets the right boundary 43 to be to the right of the right edge line and the distance between the right boundary 43 and the right edge line to be the preset head width range d. The preset head width range d is between a width w (for example, 30 pixels) corresponding to a person's head in the image frame 401 multiplied by a minimum multiple and the width w (for example, 30 pixels) corresponding to the person's head in the image frame 401 multiplied by a maximum multiple. In an embodiment, the preset head width range is $0.5w<d<4w$.

It is to be noted that the heights or head width in the image frame corresponding to a person, the first preset height, and the second preset height, and the preset head width range may be expressed in distance units (for example, centimeters, millimeters), and image pixel may also be used as a unit, and the disclosure is not limited thereto. The processor 130 automatically converts all parameters and variables into the same unit. For example, in one embodiment, 1 centimeter is equal to 37.795275591 pixels. The processing unit 130 may convert all the parameters and variables between centimeters and pixels accordingly.

In an embodiment, the processor 130 marks the event detection area 40 in the image frame and displays the event detection area 40 through the display. In another embodiment, the processor 130 further marks the first preset height and the second preset height in the image frame, and displays the first preset height and the second preset height through the display. In other words, the processor 130 may mark any geometric shapes and parameters associated with the event detection area 40 in the image frame, and the disclosure is not limited thereto.

In step S304, the processor 130 is configured to detect and track the person image corresponding to a person in the image stream. Specifically, the processor 130 reads continuous image frames in the image stream, and detects and tracks a candidate area in the continuous image frames corresponding to the person image. The processor 130 may perform human detection on the image frame to define the candidate area, and define a top center point of the candidate area as a head reference point. In this embodiment, the processor 130 may detect a whole-body image or a partial image (for example, the head) of the person, and one or more people may be detected.

Specifically, the processor 130 may perform human detection through computer vision or a deep learning model to detect the person image in the image frame. For example, the deep learning model is implemented by a learning network such as a convolution neural network (CNN), and the disclosure is not limited thereto. The CNN is formed by at least one convolution layer, at least one pooling layer, and at least one fully connected layer. The front part of the CNN is usually formed by a convolutional layer and a pooling layer connected in series or parallel, and is configured to capture a feature value of the image. The feature value may be a multi-dimensional array, which may be regarded as a feature vector representing the image. The latter part of the CNN includes a fully connected layer. The fully connected layer classifies objects in the image according to the feature values generated by the convolutional layer and the pooling layer, and may obtain object information corresponding to the identified objects. The object information includes a bounding box configured to circle the identified objects, and the object information also includes the type(s) of the identified objects. In this embodiment, the method of the convolution operation may be implemented by steps of any kind of convolution operation in the technical field, and the disclosure is not limited. The detailed steps and implementation methods may be obtained from sufficient teaching, advice, and implementation instructions from the common knowledge in the technical field. Therefore, the details thereof are omitted herein.

Then, after detecting the person image in the image frame, the processor 130 may define the candidate area corresponding to the person image. For example, the processor 130 may define the bounding box as the candidate area. The processor 130 sets the candidate area to be associated with a specific person image, and the size of the candidate area is at least large enough to enclose the person image corresponding to the candidate area. The candidate area may include the head reference point. If the candidate area corresponds to the whole-body image of the person, the position of the head reference point may be the center point of the upper boundary of the candidate area or any point of the upper boundary. If the candidate area corresponds to the head image of the person, the position of the head reference point may be the center point of the upper boundary of the candidate area, any point of the upper boundary, or the center point of the candidate area, and the disclosure is not limited thereto.

Figure 5:
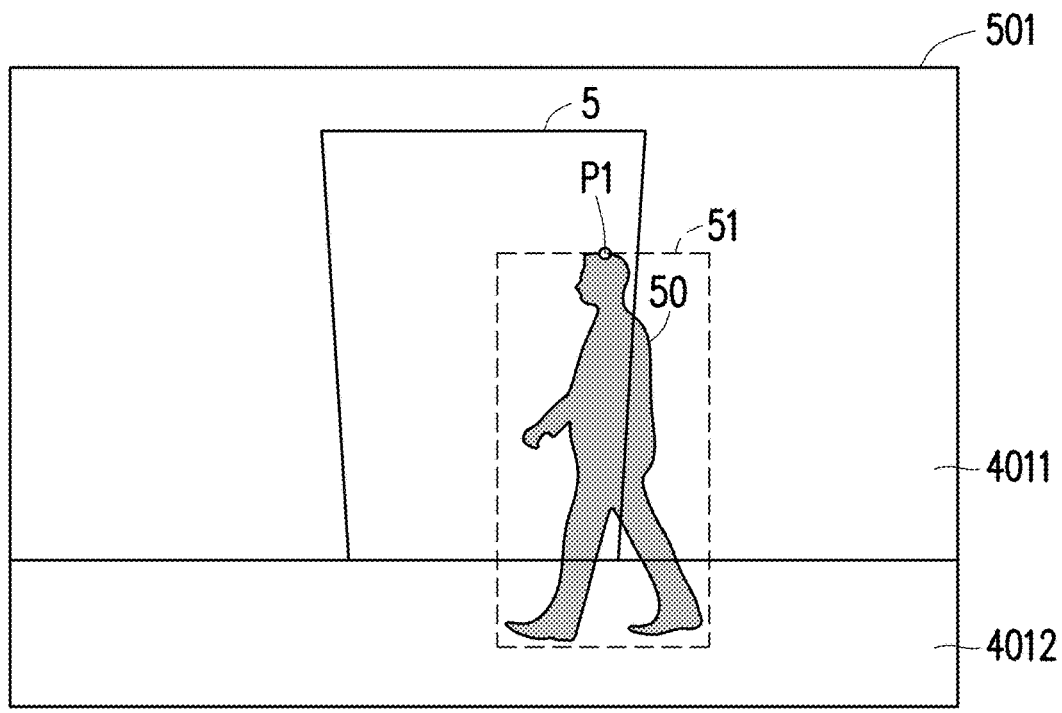
FIG. 5 is a schematic diagram illustrating a candidate area according to an embodiment of the disclosure.

FIG. 5 is a schematic diagram illustrating a candidate area according to an embodiment of the disclosure. Referring to FIG. 5, an image frame 501 includes a person image 50 and a candidate area 51 corresponding to the person image 50, and the processor 130 sets the center point of the upper boundary of the candidate area 51 as a head reference point P1.

In this embodiment, the processor 130 further tracks the movement of the person. For example, the processor 130 may use various conventional object tracking technologies to track the candidate areas associated with the same person, or analyze the relationship between the position of the candidate area in a previous image frame and the position of the candidate area in a current image frame to track the candidate area so as to detect the movement of the person, but the disclosure is not limited thereto. The detailed steps and implementation methods of tracking the movement of a person may be obtained from sufficient teaching, advice, and implementation instructions from the common knowledge in the technical field. Therefore, the details thereof are omitted herein.

Referring back to FIG. 3, in step S306, the processor 130 is configured to determine whether a person passes through or does not pass through the entrance according to a first detection result and a second detection result. In this embodiment, the processor 130 tracks the person image to generate a tracking trajectory of the candidate area corresponding to the person image, and the processor 130 determines at least two detection results according to the tracking trajectory. Specifically, the processor 130 tracks the person image corresponding to the same person, and generates the first detection result and the second detection result according to the tracking trajectory of the candidate area. In addition, the processor 130 determines whether the person passes through or does not pass through the entrance according to the first detection result and the second detection result. The processor 130 may track a whole-body image or a partial image corresponding to the same person to generate a trajectory of the head reference point, and the disclosure is not limited thereto.

In this embodiment, the head reference point is used as an example for detailed description. Referring to FIG. 4, based on the event detection area 40 set by the disclosure, the candidate area of each person image may enter or leave the event detection area 40 by the following six methods:

Method 1: The head reference point moves from outside the event detection area 40, passes through the upper boundary 41 and enters the internal area 45.

Method 2: The head reference point moves from the internal area 45, passes through the upper boundary 41 and leaves the event detection area 40.

Method 3: The head reference point moves from outside the event detection area 40, passes through the lower boundary (the left boundary 42, the right boundary 43, or the bottom boundary 44), and enters the internal area 45.

Method 4: The head reference point moves from the internal area 45, passes through the lower boundary (the left boundary 42, the right boundary 43, or the bottom boundary 44), and leaves the event detection area 40.

Method 5: The coordinate position where the head reference point first appears is located in the internal area 45.

Method 6: The coordinate position where the head reference point disappears is located in the internal area 45.

Accordingly, the first detection result generated by the processor 130 according to the tracking trajectory may be one of method 1, method 3, or method 5, in which the head reference point enters the event detection area 40, among the six methods described above, and the second detection result may be one of method 2, method 4, or method 6, in which the head reference point leaves the event detection area 40, among the six methods described above. The processor 130 may determine a combination of one of the three methods in which the head reference point enters the event detection area 40 and one of the three methods in which the head reference point leaves the event detection area 40 in sequence according to the tracking trajectory, so as to determine whether the person passes through or does not pass through the entrance. Based on the three entering methods and the three leaving methods among the six methods of entering and leaving corresponding to the event detection area 40, the combinations of one of the three entering methods and one of the three leaving methods may generate the following nine events:

It is to be noted that in the following events 1 to 9, that the head reference point disappears means that the processor 130 can no longer track the person image associated with the same person in the image frame; therefore, the processor 130 cannot continue to provide the candidate area and the head reference point corresponding to the person image. Furthermore, that the head reference point first appears in the image frame means that the processor 130 detects the person image associated with the person in the image frame for the first time; therefore, the processor 130 generates the candidate area and the head reference point corresponding to the person image.

Figure 6A:
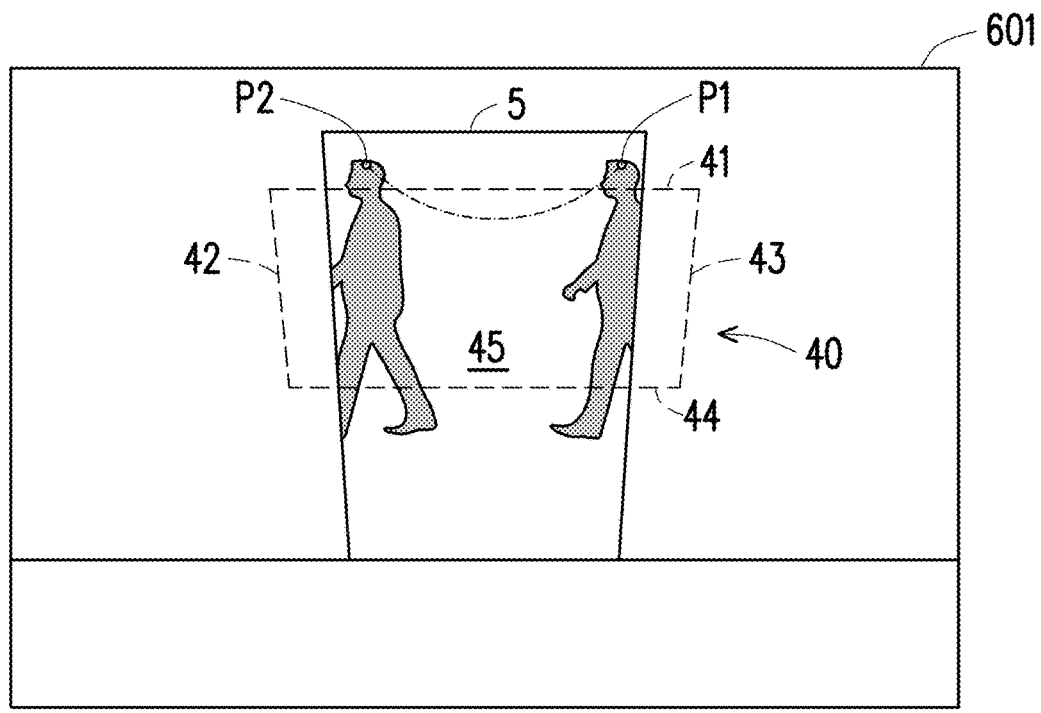
FIGS. 6A to 6C are schematic diagrams illustrating an event based on a first entering method according to an embodiment of the disclosure.

Event 1: Referring to FIG. 6A, FIG. 6A is a schematic diagram illustrating an event based on a first entering method according to an embodiment of the disclosure. In an image frame 601, the head reference point P1 and a head reference point P2 represent the previous head reference point and the current head reference point of the person image corresponding to the same person detected by the processor 130, respectively. In the process of the processor 130 tracking the person image, there are two time points, which are when the candidate area corresponding to the person image enters the event detection area 40 and when the candidate area corresponding to the person image leaves the event detection area 40. In fact, the head reference point P1 and the head reference point P2 represent the coordinate positions of the head reference point of the person image corresponding to the two time points described above, respectively. In other words, the head reference point P1 represents the previous coordinate position of the person image, and the head reference point P2 represents the current coordinate position of the person image, which is also the case in the following events 2 to 9. In event 1, the first detection result is that the head reference point P1 moves from outside event detection area 40, passes through the upper boundary 41, and enters the internal area 45, and the second detection result is that the head reference point P2 passes through the upper boundary 41 and leaves the event detection area 40.

Figure 6B:
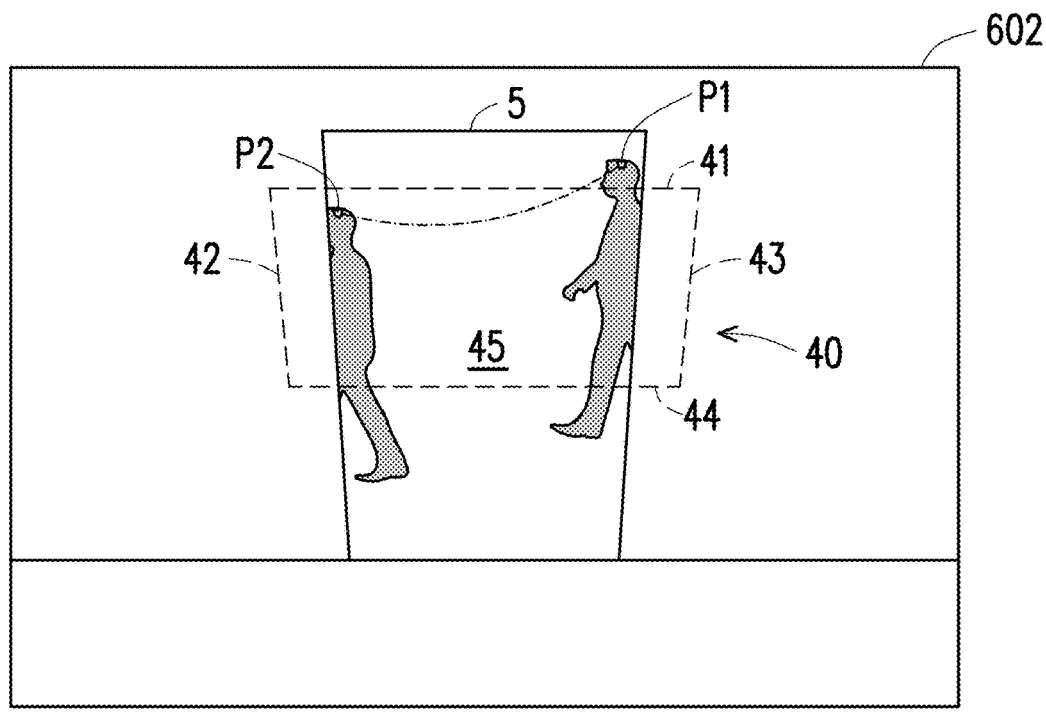

Event 2: Referring to FIG. 6B, FIG. 6B is a schematic diagram illustrating an event based on a first entering method according to an embodiment of the disclosure. In an image frame 602, the first detection result is that the head reference point P1 moves from outside the event detection area 40, passes through the upper boundary 41, and enters the internal area 45, and the second detection result is that the coordinate position where the head reference point P2 disappears is located in the internal area 45.

Figure 6C:
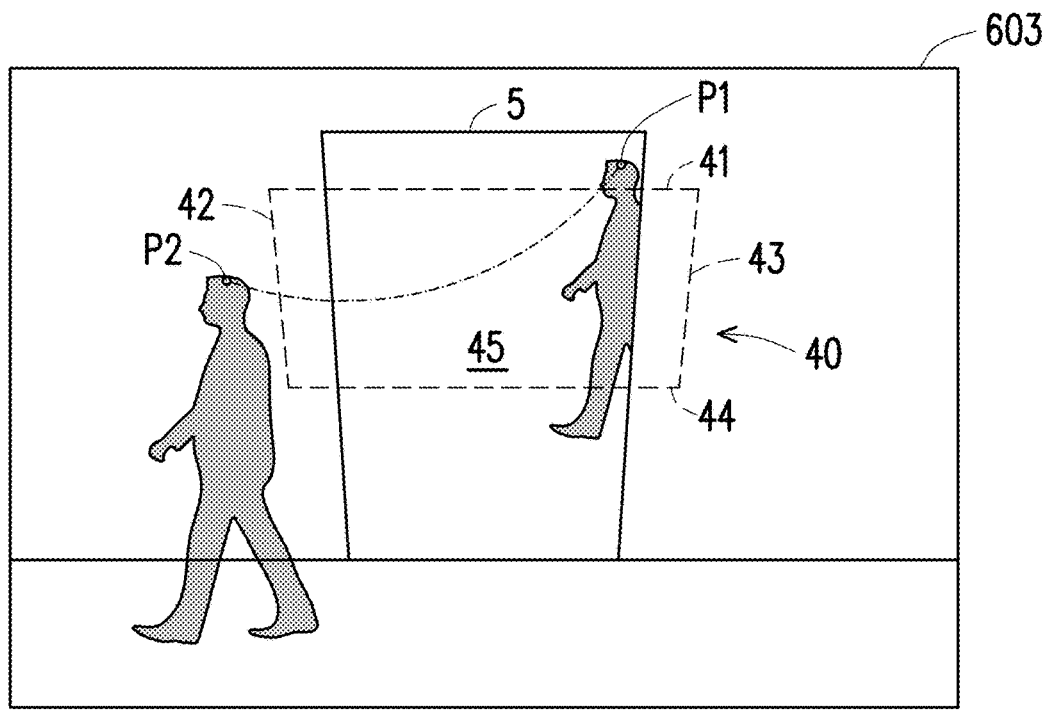

Event 3: Referring to FIG. 6C, FIG. 6C is a schematic diagram illustrating an event based on a first entering method according to an embodiment of the disclosure. In an image frame 603, the first detection result is that the head reference point P1 moves from outside the event detection area 40, passes through the upper boundary 41, and enters the internal area 45, and the second detection result is that the head reference point P2 passes through the lower boundary (the left boundary 42, the right boundary 43, or the bottom boundary 44) and leaves the event detection area 40.

Figure 6D:
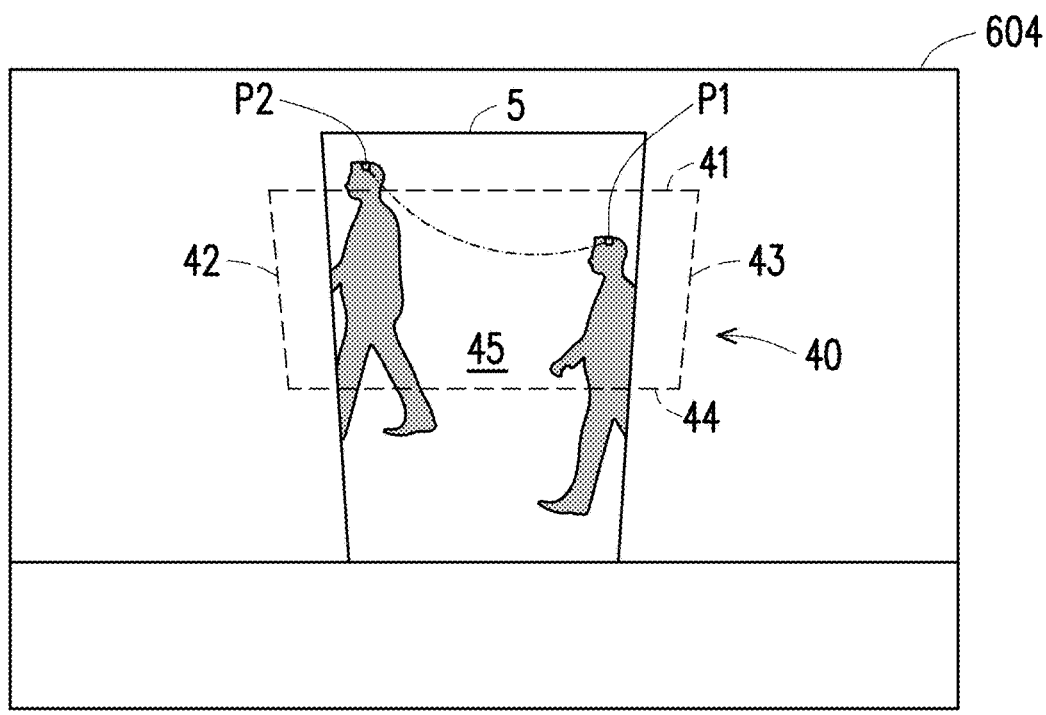
FIGS. 6D to 6F are schematic diagrams illustrating an event based on a second entering method according to an embodiment of the disclosure.

Event 4: Referring to FIG. 6D, FIG. 6D is a schematic diagram illustrating an event based on a second entering method according to an embodiment of the disclosure. In an image frame 604, the first detection result is that the coordinate position where the head reference point P1 first appears is located in the internal area 45, and the second detection result is that the head reference point P2 passes through the upper boundary 41 and leaves the event detection area 40.

Figure 6E:
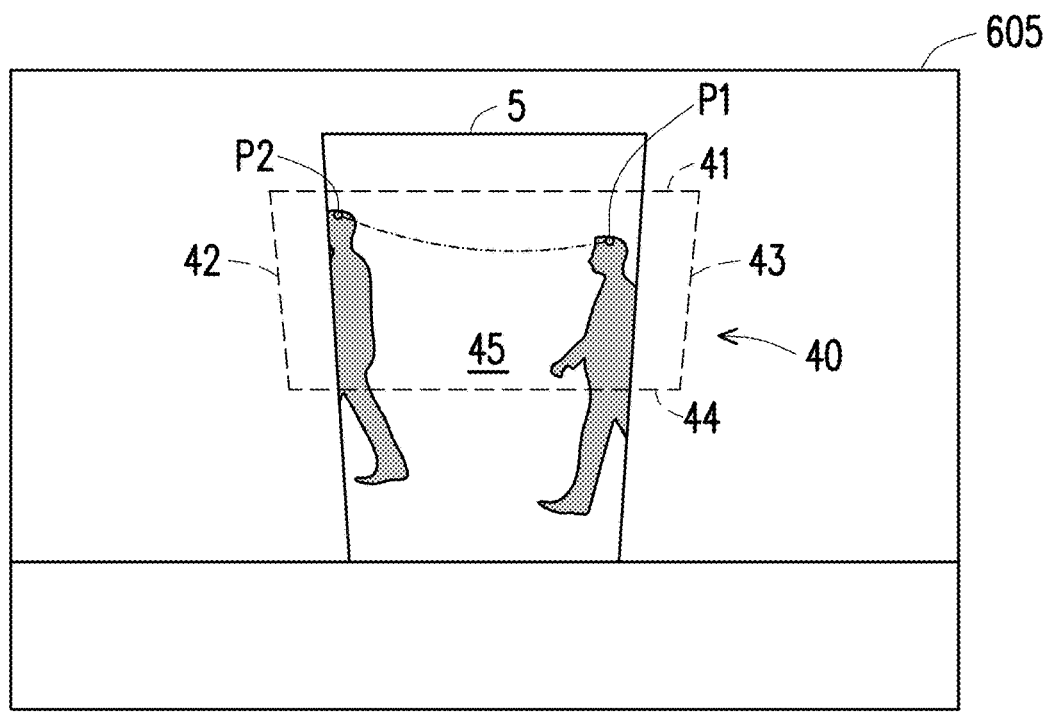

Event 5: Referring to FIG. 6E, FIG. 6E is a schematic diagram illustrating an event based on a second entering method according to an embodiment of the disclosure. In an image frame 605, the first detection result is that the coordinate position where the head reference point P1 first appears is located in the internal area 45, and the second detection result is that the coordinate position where the head reference point P2 disappears is located in the internal area 45.

Figure 6F:
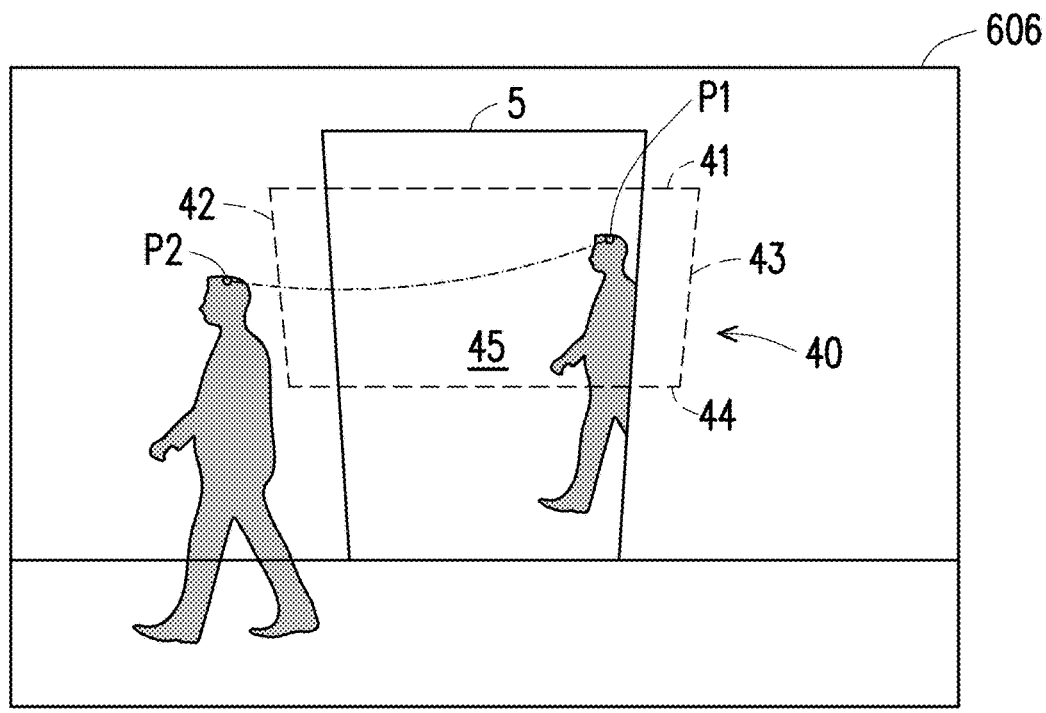

Event 6: Referring to FIG. 6F, FIG. 6F is a schematic diagram illustrating an event based on a second entering method according to an embodiment of the disclosure. In an image frame 606, the first detection result is that the coordinate position where the head reference point P1 first appears is located in the internal area 45, and the second detection result is that the head reference point P2 passes through the lower boundary (the left boundary 42, the right boundary 43, or the bottom boundary 44), and leaves the event detection area 40.

Figure 6G:
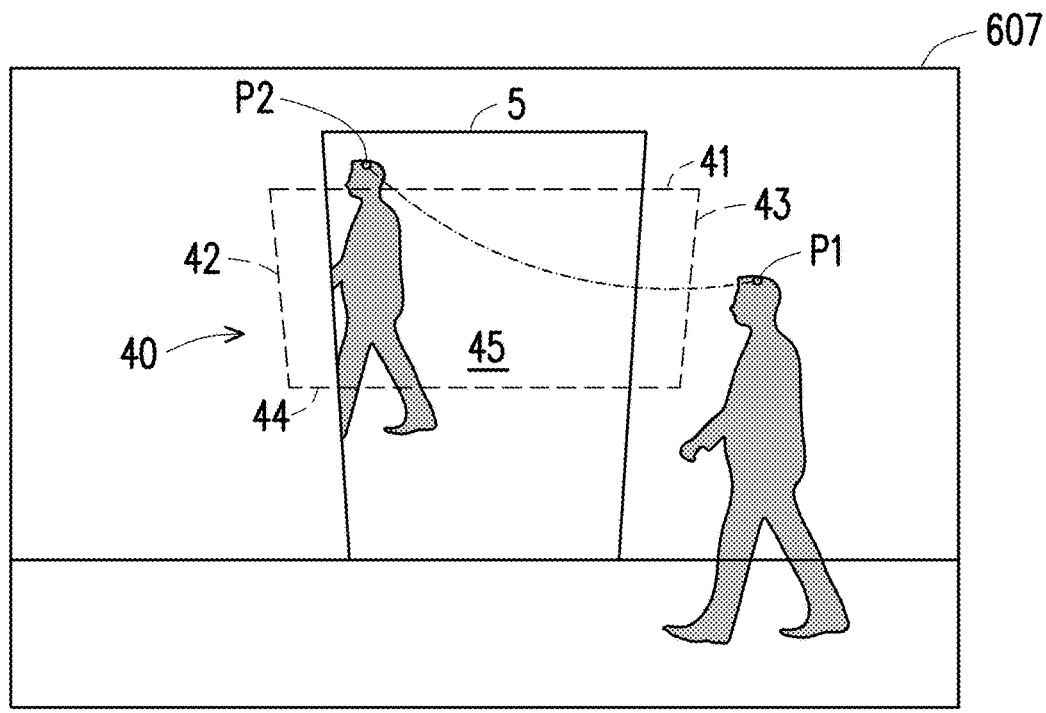
FIGS. 6G to 6I are schematic diagrams illustrating an event based on a third entering method according to an embodiment of the disclosure.

Event 7: Referring to FIG. 6G, FIG. 6G is a schematic diagram illustrating an event based on a third entering method according to an embodiment of the disclosure. In an image frame 607, the first detection result is that the head reference point P1 moves from outside the event detection area 40, passes through the lower boundary (the left boundary 42, the right boundary 43, or the bottom boundary 44), and enters the internal area 45, and the second detection result is that the head reference point P2 passes through the upper boundary 41 and leaves the event detection area 40.

Figure 6H:
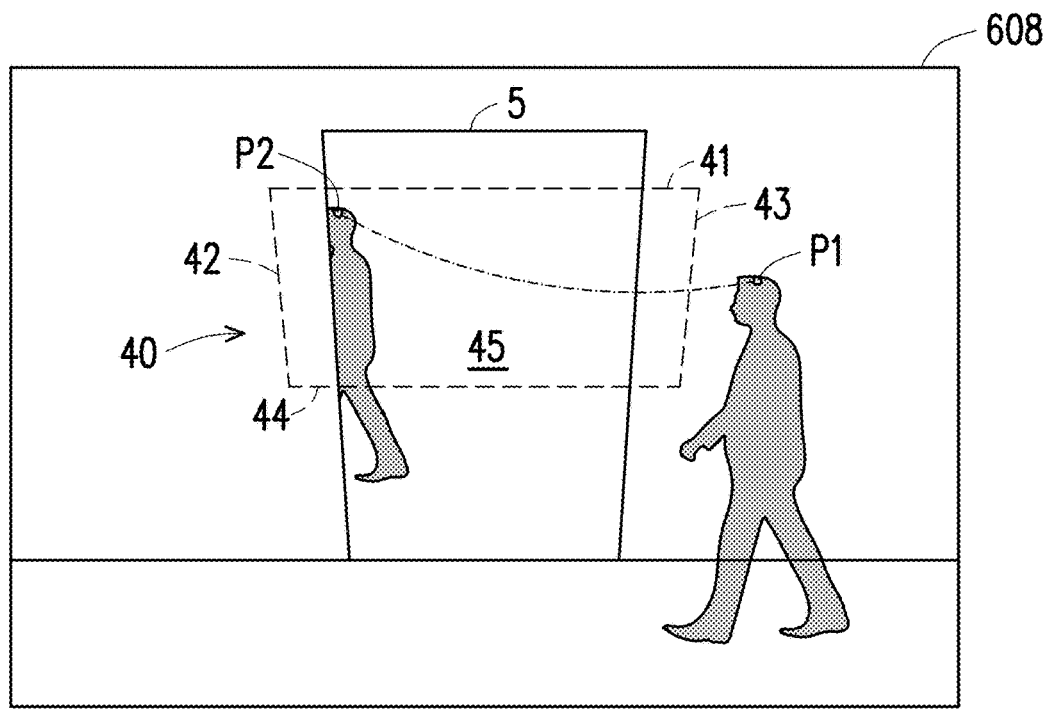

Event 8: Referring to FIG. 6H, FIG. 6H is a schematic diagram illustrating an event based on a third entering method according to an embodiment of the disclosure. In an image frame 608, the first detection result is that the head reference point P1 moves from outside the event detection area 40, passes through the lower boundary (the left boundary 42, the right boundary 43, or the bottom boundary 44), and enters the internal area 45, and the second detection result is that the coordinate position where the head reference point P2 disappears is located in the internal area 45.

Figure 6I:
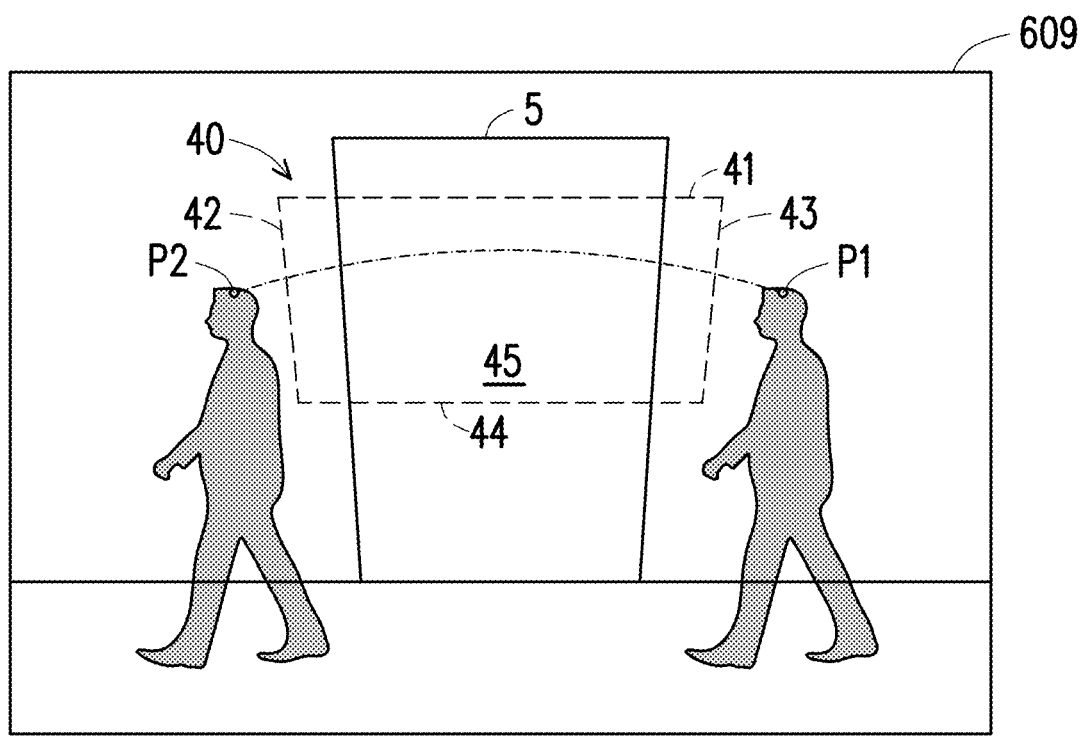

Event 9: Referring to FIG. 6I, FIG. 6I is a schematic diagram illustrating an event based on a third entering method according to an embodiment of the disclosure. In an image frame 609, the first detection result is that the head reference point P1 moves from outside the event detection area 40, passes through the lower boundary (the left boundary 42, the right boundary 43, or the bottom boundary 44), and enters the internal area 45, and the second detection result is that the head reference point P2 passes through the lower boundary (the left boundary 42, the right boundary 43, or the bottom boundary 44) and leaves the event detection area 40.

Returning to FIG. 3, in step S306, in events 1, 2, 4, 5, and 9 described above, the processor 130 determines that the person does not pass through the entrance. In events 3, 6, 7, and 8 described above, the processor 130 determines that the person passes through the entrance.

In summary of events 1, 2, 4, and 5, that is, when the first detection result is that the head reference point P1 moves from outside the event detection area 40, passes through the upper boundary 41, and enters the internal area 45, or that the coordinate position where the head reference point P1 first appears is located in the internal area 45, and the second detection result is that the head reference point P2 passes through the upper boundary 41 and leaves the event detection area 40, or that the coordinate position where the head reference point P2 disappears is located in the internal area 45, the processor 130 determines that the person does not pass through the entrance.

The following examples illustrate specific applications of the determination results of whether a person passes through or does not pass through an entrance as described in step S306 in real fields.

First Example

Figure 7:
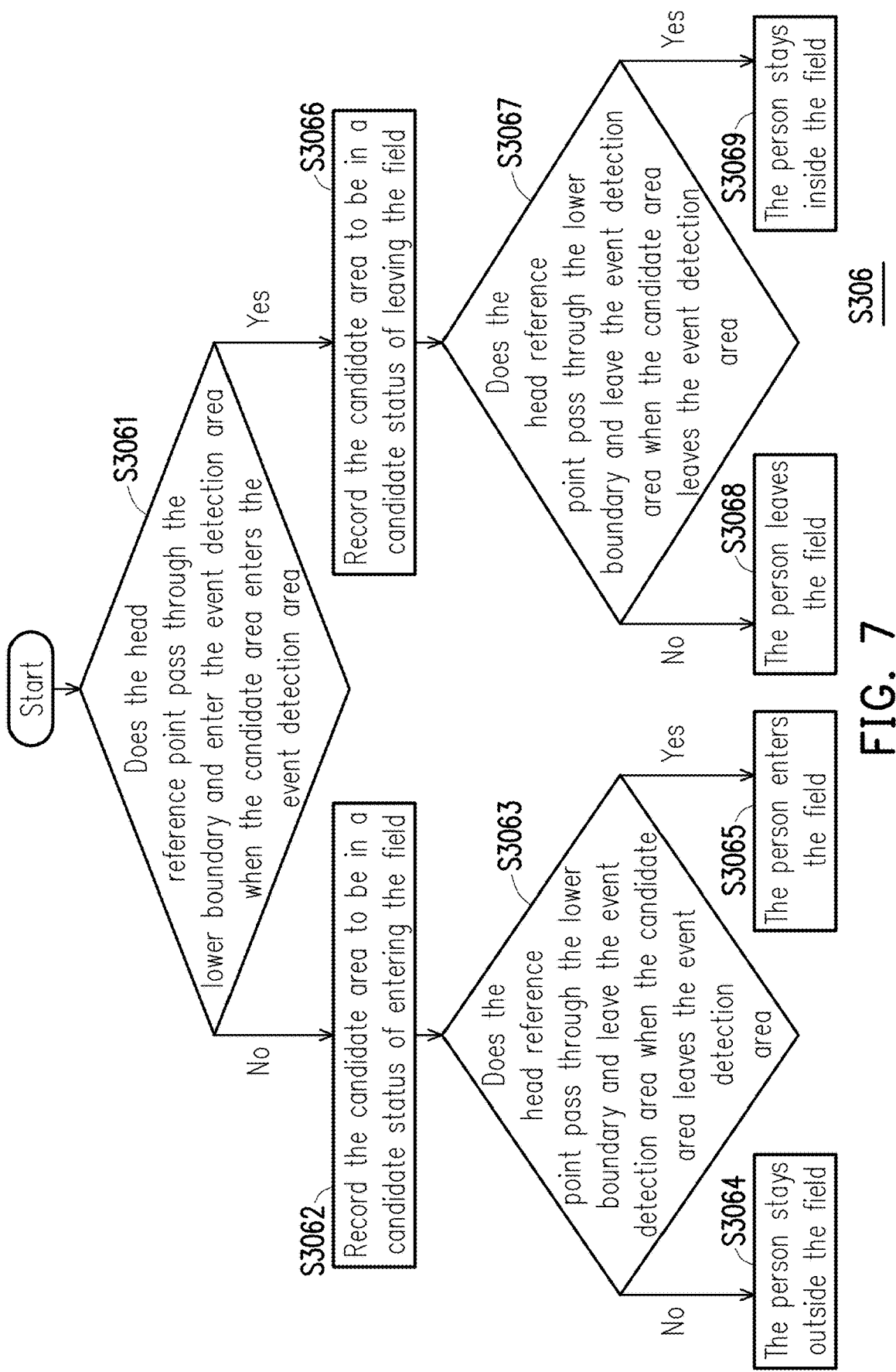
FIG. 7 is a flowchart illustrating a method for detecting people entering and leaving a field according to an embodiment of the disclosure.

FIG. 7 is a flowchart illustrating a method for detecting people entering and leaving a field according to an embodiment of the disclosure. The method of this embodiment is at least applicable to the system 100, but the disclosure is not limited thereto. Referring to FIGS. 1 and 2 together, the detailed steps of the method for detecting people entering and leaving a field in this embodiment are described below with various apparatus and devices of the system 100. In this embodiment, the camera 110 is disposed inside the field. That is, regarding the two sides, which are an area that is inside the field and an area that is outside the field, corresponding to and connected by the entrance, if a person moves from the side where the camera 110 is located, passes through the entrance, and enters the side opposite to where the camera 110 is located (the other side of the entrance), the processor 130 determines that the person leaves the field. Conversely, if the person moves from the side opposite to where the camera 110 is located, passes through the entrance, and enters the side where the camera 110 is located, the processor 130 determines that the person enters the field.

Referring to FIG. 7, in step S3061, the processor 130 determines whether the head reference point passes through the lower boundary and enters the event detection area when the candidate area enters the event detection area. For example, the determination result of step S3061 is the first detection result, and details thereof may be referred to in the entering methods of 1, 3, and 5 described above. If the processor 130 determines that the head reference point does not pass through the lower boundary and enters the event detection area (the processor 130 determines "No" in step S3061) when the candidate area enters the event detection area, in step S3062, the processor 130 records the candidate area to be in a candidate status of entering the field. Next, in step S3063, the processor 130 determines whether the head reference point passes through the lower boundary and leaves the event detection area when the candidate area leaves the event detection area. For example, the determination result of step S3063 is the second detection result, and details thereof may be referred to in the leaving methods of 2, 4, and 6 described above.

If the processor 130 determines that the head reference point does not pass through the lower boundary and leaves the event detection area (the processor 130 determines "No" in step S3063) when the candidate area leaves the event detection area, in step S3064, the processor 130 determines the movement status of the person to be that the person stays outside the field. Specifically, the determination result corresponding to step S3064 may correspond to event 1, event 2, event 4, and event 5 described above.

If the head reference point P1 moves from outside the event detection area 40, passes through the upper boundary 41, and enters the internal area 45 as shown in FIG. 6A, the candidate area corresponding to the head reference point P1 is recorded to be in the candidate status of entering the field. After that, if the head reference point P2 moves from the internal area 45, passes through the upper boundary 41, and leaves the event detection area 40, it is determined that the person stays outside the field.

If the head reference point P1 moves from outside the event detection area 40, passes through the upper boundary 41, and enters the internal area 45 as shown in FIG. 6B, the candidate area corresponding to the head reference point P1 is recorded to be in the candidate status of entering the field. After that, if the coordinate position where the head reference point P2 disappears is located in the internal area 45, it is determined that the person stays outside the field.

If the coordinate position where the head reference point P1 first appears is located in the internal area 45 as shown in FIG. 6D, the candidate area corresponding to the head reference point P1 is recorded to be in the candidate status of entering the field. After that, if the head reference point P2 passes through the upper boundary 41 and leaves the event detection area 40, it is determined that the person stays outside the field.

If the coordinate position where the head reference point P1 first appears is located in the internal area 45 as shown in FIG. 6E, the candidate area corresponding to the head reference point P1 is recorded to be in the candidate status of entering the field. After that, if the coordinate position where the head reference point P2 disappears is located in the internal area 45, it is determined that the person stays outside the field.

Referring back to FIG. 7, if the processor 130 determines that the head reference point passes through the lower boundary and leaves the event detection area (the processor 130 determines "Yes" in step S3063) when the candidate area leaves the event detection area, in step S3065, the processor 130 determines the movement status of the person to be that the person enters the field. Specifically, the determination result corresponding to step S3065 may correspond to event 3 and event 6 described above.

If the head reference point P1 moves from outside the event detection area 40, passes through the upper boundary 41, and enters the internal area 45 as shown in FIG. 6C, the candidate area corresponding to the head reference point P1 is recorded to be in the candidate status of entering the field. After that, if the head reference point P2 passes through the lower boundary (the left boundary 42, the right boundary 43, or the bottom boundary 44) and leaves the event detection area 40, it is determined that the person enters the field.

If the coordinate position where the head reference point P1 first appears is located in the internal area 45 as shown in FIG. 6F, the candidate area corresponding to the head reference point P1 is recorded to be in the candidate status of entering the field. After that, if the head reference point P2 passes through the lower boundary (the left boundary 42, the right boundary 43, or the bottom boundary 44) and leaves the event detection area 40, it is determined that the person enters the field.

Referring back to FIG. 7, if the processor 130 determines that the head reference point passes through the lower boundary and enters the event detection area (the processor 130 determines "Yes" in step S3061) when the candidate area enters the event detection area, in step S3066, the processor 130 records the candidate area to be in a candidate status of leaving the field. Next, in step S3067, the processor 130 determines whether the head reference point passes through the lower boundary and leaves the event detection area when the candidate area leaves the event detection area. For example, the determination result of step S3067 is the second detection result, and details thereof may be referred to in the leaving methods of 2, 4, and 6 described above.

If the processor 130 determines that the head reference point does not pass the lower boundary and leaves the event detection area (the processor 130 determines "No" in step S3067) when the candidate area leaves the event detection area, in step S3068, the processor 130 determines the movement status of the person to be that the person leaves the field. Specifically, the determination result corresponding to step S3068 may correspond to event 7 and event 8 described above.

If the head reference point P1 moves from outside the event detection area 40, passes through the lower boundary (the left boundary 42, the right boundary 43, or the bottom boundary 44), and enters the internal area 45 as shown in FIG. 6G, the candidate area corresponding to the head reference point P1 is recorded to be in the candidate status of leaving the field. After that, if the head reference point P2 passes through the upper boundary 41 and leaves the event detection area 40, it is determined that the person leaves the field.

If the head reference point P1 moves from outside the event detection area 40, passes through the lower boundary (the left boundary 42, the right boundary 43, or the bottom boundary 44), and enters the internal area 45 as shown in FIG. 6H, the candidate area corresponding to the head reference point P1 is recorded to be in the candidate status of leaving the field. After that, if the coordinate position where the head reference point P2 disappears is located in the internal area 45, it is determined that the person leaves the field.

Referring back to FIG. 7, if the processor 130 determines that the head reference point passes through the lower boundary and leaves the event detection area (the processor 130 determines "Yes" in step S3067) when the candidate area leaves the event detection area, in step S3069, the processor 130 determines the movement status of the person to be that the person stays inside the field. Specifically, the determination result corresponding to step S3069 may correspond to event 9 described above.

If the head reference point P1 moves from outside the event detection area 40, passes through the lower boundary (the left boundary 42, the right boundary 43, or the bottom boundary 44), and enters the internal area 45 as shown in FIG. 6I, the candidate area corresponding to the head reference point P1 is recorded to be in the candidate status of leaving the field. After that, if the head reference point P2 pass through the lower boundary (the left boundary 42, the right boundary 43, or the bottom boundary 44) and leaves the event detection area 40, it is determined that the person stays inside the field.

Second Example

In this example, the camera 110 is disposed outside the field. That is, regarding the two sides, which are an area that is inside the field and an area that is outside the field, corresponding to and connected by the entrance, if a person moves from the side where the camera 110 is located, passes through the entrance, and enters the side opposite to where the camera 110 is located (the other side of the entrance), the processor 130 determines that the person enters the field. Conversely, if the person moves from the side opposite to where the camera 110 is located, passes through the entrance, and enters the side where the camera 110 is located, the processor 130 determines that the person leaves the field. The details of this example may be referred to in the detailed description in the first example. In this example, the candidate status of entering the field in the first example is replaced by the candidate status of leaving the field; the candidate status of leaving the field in the first example is replaced by the candidate status of entering the field; entering the field in the first example is replaced by leaving the field; leaving the field in the first example is replaced by entering the field; staying outside the field in the first example is replaced by staying inside the field; and staying inside the field in the first example is replaced by staying outside the field. The details thereof are omitted herein.

In summary, the system, method, and storage medium for detecting people entering and leaving a field provided by the disclosure may set the event detection area corresponding to the entrance, and determine whether the person passes through the entrance according to the set event detection area, so as to further determine the movement status of the person to be that the person enters the field, leaves the field, or stays inside or outside the field. The disclosure disposes the camera at a high place and detects people entering and leaving a field according to the head reference point of the person image, so as to avoid the case of being unable to determine the person entering and leaving a field according to the foot image because the lower body image of a person is blocked in a crowded situation. Therefore, the disclosure may reduce the misdetection rate of detecting people entering and leaving in a crowded situation.

Furthermore, the disclosure sets the upper boundary for taller people and the bottom boundary for shorter people, so as to prevent a taller person from accidentally touching the upper boundary when they stand in front of the entrance or inside the walls (on the side where the camera is located), causing a false positive result, and to prevent a shorter person from having a person image that is lower than bottom boundary when they stand behind the entrance or outside the walls (on the opposite side where the camera is located), causing a false negative result. In addition, the left boundary and right boundary set in the disclosure may determine whether the person is located on the side where the camera is located or on the opposite side where the camera is located before they enter the entrance (before the person image corresponding to the person enters the event detection area) from two sides of the entrance, and whether the person is located on the side where the camera is located or on the opposite side where the camera is located before they leave the entrance (before the person image corresponding to the person leaves the event detection area) from two sides of the entrance. The person's height does not influence the determination result. Therefore, the disclosure may reduce the misdetection rate of detecting people entering and leaving in a situation where the height differences between people are obvious.

Lastly, the disclosure sets the lower boundary (including the left boundary, the right boundary and the bottom boundary) as the basis for detecting people entering and leaving a field in the image. In fact, the detection position of people entering and leaving a field is set to a position on the side where the camera is located (a low backlight zone). For example, in the first example where the camera is set inside the field, when a person enters the field, all events of the head reference point of the tracked person image disappearing in the internal area (a high backlight area) are regarded as the person staying in or passing by the area outside the field (FIGS. 6B and 6E), and are not listed as an entering and leaving event; therefore, the accuracy of detecting people entering and leaving a field is not affected. It is determined that the person enters the field (FIGS. 6C and 6F) only when the head reference point passes through the lower boundary (the low backlight zone). When a person leaves the field, the head reference point of the tracked person image passes through the lower boundary (the low backlight zone) and enters the internal area (high backlight zone). Once the head reference point disappears (including when the tracking is interrupted), it is determined that the person leaves the field (FIG. 6H). Therefore, the disclosure may reduce the misdetection rate of detecting people entering and leaving in a situation of backlight interference.

Based on the above, the system, method, and storage medium for detecting people entering and leaving a field provided by the disclosure may be combined with an existing monitoring system to facilitate the integration of application services related to person feature analysis. In addition, the system, method, and storage medium for detecting people entering and leaving a field provided by the disclosure may also reduce the misdetection rate of detecting people entering and leaving in a crowded situation and in a situation where the height differences between people are obvious, and increase the accuracy of detecting.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A system for detecting people entering and leaving a field, comprising:
   a camera, disposed at a high place, capturing an entrance from a depression angle and outputting an image stream at the same time; and
   a processor, coupled to the camera, configured to receive the image stream and set an event detection area corresponding to the entrance, wherein the event detection area comprises an upper boundary, a lower boundary, and an internal area, and the lower boundary comprises a left boundary, a right boundary, and a bottom boundary,
   wherein the processor is configured to detect and track a person image corresponding to a person in the image stream, and the person image is a whole-body image or a partial image,
   wherein the processor is configured to determine whether the person passes through or does not pass through the entrance according to a first detection result and a second detection result,
   wherein when the first detection result indicates that a coordinate position where a candidate area corresponding to the person image first appears is located in the internal area, and the second detection result indicates that the candidate area passes through the lower boundary and leaves the event detection area, the processor determines that the person passes through the entrance,
   wherein when the first detection result indicates that the candidate area moves from outside the event detection area, passes through the lower boundary, and enters the internal area, and the second detection result indicates that a coordinate position where the candidate area disappears is located in the internal area, the processor determines that the person passes through the entrance,
   wherein the entrance comprises a left wall, the left wall corresponds to a left edge line, and the left boundary is to the left of the left edge line,
   wherein the entrance further comprises a right wall, the right wall corresponds to a right edge line, and the right boundary is to the right of the right edge line.

2. The system for detecting people entering and leaving a field according to claim 1, wherein the candidate area corresponding to the person image comprises a head reference point, and the processor is configured to determine whether the person passes through or does not pass through the entrance according to the head reference point.

3. The system for detecting people entering and leaving a field according to claim 2, wherein the processor is configured to perform human detection on an image frame of the image stream to define the candidate area, and
   the processor is configured to define a top center point of the candidate area as the head reference point.

4. The system for detecting people entering and leaving a field according to claim 2, wherein the entrance connects an area that is inside the field and an area that is outside the field, the camera is disposed inside the field, and the processor further determines whether the person enters the field or leaves the field according to the first detection result and the second detection result,
   wherein when the first detection result indicates that the head reference point does not pass through the lower boundary when the candidate area enters the event detection area, and the second detection result indicates that the head reference point passes through the lower boundary when the candidate area leaves the event detection area, the processor determines that the person enters the field,
   wherein when the first detection result indicates that the head reference point passes through the lower boundary when the candidate area enters the event detection area, and the second detection result indicates that the head reference point does not pass through the lower boundary when the candidate area leaves the event detection area, the processor determines that the person leaves the field.

5. The system for detecting people entering and leaving a field according to claim 2, wherein the entrance connects an area that is inside the field and an area that is outside the field, the camera is disposed outside the field, and the processor further determines whether the person enters the field or leaves the field according to the first detection result and the second detection result,
   wherein when the first detection result indicates that the head reference point does not pass through the lower boundary when the candidate area enters the event detection area, and the second detection result indicates that the head reference point passes through the lower boundary when the candidate area leaves the event detection area, the processor determines that the person leaves the field,
   wherein when the first detection result indicates that the head reference point passes through the lower boundary when the candidate area enters the event detection area, and the second detection result indicates that the head reference point does not pass through the lower boundary when the candidate area leaves the event detection area, the processor determines that the person enters the field.

6. The system for detecting people entering and leaving a field according to claim 1, wherein the processor sets a height position of the upper boundary in an image frame according to a first preset height, and the processor sets a height position of the bottom boundary in the image frame according to a second preset height, wherein the first preset height and the second preset height are determined according to a height range of people in the real world.

7. The system for detecting people entering and leaving a field according to claim 1, wherein a distance between the left boundary and the left edge line is a preset head width range, and a distance between the right boundary and the right edge line is the preset head width range.

8. The system for detecting people entering and leaving a field according to claim 1, wherein when the first detection result indicates that the candidate area moves from outside the event detection area, passes through the upper boundary, and enters the internal area, and the second detection result indicates that the candidate area passes through the lower boundary and leaves the event detection area, the processor determines that the person passes through the entrance,
   wherein when the first detection result indicates that the candidate area moves from outside the event detection area, passes through the lower boundary, and enters the internal area, and the second detection result indicates that the candidate area passes through the upper boundary and leaves the event detection area, the processor determines that the person passes through the entrance.

9. The system for detecting people entering and leaving a field according to claim 1, wherein when the first detection result indicates that the candidate area moves from outside the event detection area, passes through the upper boundary, and enters the internal area or a coordinate position where the candidate area first appears is located in the internal area, and the second detection result indicates that the candidate area passes through the upper boundary and leaves the event detection area or a coordinate position where the candidate area disappears is located in the internal area, the processor determines that the person does not pass through the entrance,
   wherein when the first detection result indicates that the candidate area moves from outside the event detection area, passes through the lower boundary, and enters the internal area, and the second detection result indicates that the candidate area passes through the lower boundary and leaves the event detection area, the processor determines that the person does not pass through the entrance.

10. A method for detecting people entering and leaving a field, adapted for a system comprising a camera and a processor, wherein the camera is disposed at a high place and captures an entrance from a depression angle and outputs an image stream at the same time, and the processor receives the image stream, wherein the method comprises:
   setting an event detection area corresponding to the entrance, wherein the event detection area comprises an upper boundary, a lower boundary, and an internal area, and the lower boundary comprises a left boundary, a right boundary, and a bottom boundary;
   detecting and tracking a person image corresponding to a person in the image stream, wherein the person image is a whole-body image or a partial image; and
   determining whether the person passes through or does not pass through the entrance according to a first detection result and a second detection result, wherein when the first detection result indicates that a coordinate position where a candidate area corresponding to the person image first appears is located in the internal area, and the second detection result indicates that the candidate area passes through the lower boundary and leaves the event detection area, the processor determines that the person passes through the entrance,
   wherein when the first detection result indicates that the candidate area moves from outside the event detection area, passes through the lower boundary, and enters the internal area, and the second detection result indicates that a coordinate position where the candidate area disappears is located in the internal area, the processor determines that the person passes through the entrance,
   wherein the entrance comprises a left wall, the left wall corresponds to a left edge line, the entrance further comprises a right wall, and the right wall corresponds to a right edge line, wherein setting the event detection area corresponding to the entrance further comprises:
   setting the left boundary to be to the left of the left edge line; and
   setting the right boundary to be to the right of the right edge line.

11. The method for detecting people entering and leaving a field according to claim 10, wherein setting the event detection area corresponding to the entrance further comprises:
   setting a distance between the left boundary and the left edge line to be a preset head width range; and
   setting a distance between the right boundary and the right edge line to be the preset head width range.

12. The method for detecting people entering and leaving a field according to claim 10, wherein the candidate area corresponding to the person image comprises a head reference point, wherein the method further comprises:
   determining whether the person passes through or does not pass through the entrance according to the head reference point.

13. The method for detecting people entering and leaving a field according to claim 12, further comprising:
   performing human detection on an image frame of the image stream to define the candidate area; and
   defining a top center point of the candidate area as the head reference point.

14. The method for detecting people entering and leaving a field according to claim 12, wherein the entrance connects an area that is inside the field and an area that is outside the field, and the camera is disposed inside the field, wherein the method further comprises:
   determining whether the person enters the field or leaves the field according to the first detection result and the second detection result,
   wherein when the first detection result indicates that the head reference point does not pass through the lower boundary when the candidate area enters the event detection area, and the second detection result indicates that the head reference point passes through the lower boundary when the candidate area leaves the event detection area, it is determined that the person enters the field,
   wherein when the first detection result indicates that the head reference point passes through the lower boundary when the candidate area enters the event detection area, and the second detection result indicates that the head reference point does not pass through the lower boundary when the candidate area leaves the event detection area, it is determined that the person leaves the field.

15. The method for detecting people entering and leaving a field according to claim 10, wherein setting the event detection area corresponding to the entrance further comprises:
   setting a height position of the upper boundary in an image frame according to a first preset height, and setting a height position of the bottom boundary in the image frame according to a second preset height, wherein the first preset height and the second preset height are determined according to a height range of people in the real world.

16. The method for detecting people entering and leaving a field according to claim 10, further comprising:
   determining that the person passes through the entrance when the first detection result indicates that the candidate area moves from outside the event detection area, passes through the upper boundary, and enters the internal area, and the second detection result indicates that the candidate area passes through the lower boundary and leaves the event detection area; and
   determining that the person passes through the entrance when the first detection result indicates that the candidate area moves from outside the event detection area, passes through the lower boundary, and enters the internal area, and the second detection result indicates that the candidate area passes through the upper boundary and leaves the event detection area.

17. The method for detecting people entering and leaving a field according to claim 10, further comprising;
   determining that the person does not pass through the entrance when the first detection result indicates that the candidate area moves from outside the event detection area, passes through the upper boundary, and enters the internal area or a coordinate position where the candidate area first appears is located in the internal area, and the second detection result indicates that the candidate area passes through the upper boundary and leaves the event detection area or a coordinate position where the candidate area disappears is located in the internal area; and determining that the person does not pass through the entrance when the first detection result indicates that the candidate area moves from outside the event detection area, passes through the lower boundary, and enters the internal area, and the second detection result indicates that the candidate area passes through the lower boundary and leaves the event detection area.

18. The method for detecting people entering and leaving a field according to claim 10, wherein the entrance connects an area that is inside the field and an area that is outside the field, and the camera is disposed outside the field, wherein the method further comprises:

determining whether the person enters the field or leaves the field according to the first detection result and the second detection result, wherein when the first detection result indicates that the head reference point does not pass through the lower boundary when the candidate area enters the event detection area, and the second detection result indicates that the head reference point passes through the lower boundary when the candidate area leaves the event detection area, it is determined that the person leaves the field, wherein when the first detection result indicates that the head reference point passes through the lower boundary when the candidate area enters the event detection area, and the second detection result indicates that the head reference point does not pass through the lower boundary when the candidate area leaves the event detection area, it is determined that the person enters the field.

19. A non-transitory computer readable storage medium, comprising at least one program instruction, wherein when an electronic apparatus loads and executes the at least one program instruction, the method according to claim 10 is completed.

* * * * *